United States Patent
Odendall

(10) Patent No.: US 12,320,283 B2
(45) Date of Patent: Jun. 3, 2025

(54) METHOD FOR OPERATING AN EXHAUST-GAS CLEANING DEVICE FOR A MOTOR VEHICLE AND CORRESPONDING EXHAUST-GAS CLEANING DEVICE

(71) Applicant: AUDI AG, Ingolstadt (DE)

(72) Inventor: Bodo Odendall, Lenting (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/245,221

(22) PCT Filed: Jul. 21, 2021

(86) PCT No.: PCT/EP2021/070412
§ 371 (c)(1),
(2) Date: Mar. 14, 2023

(87) PCT Pub. No.: WO2022/053211
PCT Pub. Date: Mar. 17, 2022

(65) Prior Publication Data
US 2023/0366339 A1    Nov. 16, 2023

(30) Foreign Application Priority Data
Sep. 14, 2020   (DE) ...................... 10 2020 123 865.7

(51) Int. Cl.
F01N 11/00     (2006.01)
F02D 41/14     (2006.01)
F02D 41/28     (2006.01)

(52) U.S. Cl.
CPC ........ *F01N 11/007* (2013.01); *F02D 41/1441* (2013.01); *F02D 41/28* (2013.01); *F01N 2550/02* (2013.01); *F02D 2041/286* (2013.01)

(58) Field of Classification Search
CPC .... F01N 11/00; F01N 2430/06; F01N 11/007; F02D 2041/286; F02D 41/1441
See application file for complete search history.

(56) References Cited

U.S. PATENT DOCUMENTS

2003/0154709 A1    8/2003 Kadowaki et al.
2012/0310512 A1   12/2012 Aoki et al.
(Continued)

FOREIGN PATENT DOCUMENTS

DE             10122842 A1 *  1/2002  ......... F02D 41/1441
DE       102006014916 A1    10/2007
(Continued)

OTHER PUBLICATIONS

DE-10122842-A1 English Machine Translation (Year: 2002).*
(Continued)

*Primary Examiner* — Anthony Ayala Delgado
(74) *Attorney, Agent, or Firm* — Maier & Maier, PLLC

(57) ABSTRACT

A method for operating an exhaust gas cleaning device for a motor vehicle, the exhaust gas cleaning device has a vehicle catalytic converter, a first lambda probe arranged upstream of the vehicle catalytic converter, and a second lambda probe arranged downstream of the vehicle catalytic converter. A signal gradient is determined chronologically between a first signal jump of a measured value of the first lambda probe and a second signal jump of the measured value in a second direction opposite to the first direction, and a signal delay of a measured value of the second lambda probe is determined after the second signal jump.

20 Claims, 1 Drawing Sheet

(56) References Cited

U.S. PATENT DOCUMENTS

2013/0297192 A1* 11/2013 Imeroski ............. F02D 41/22
                                                  701/112
2016/0160778 A1   6/2016 Miyamoto et al.

FOREIGN PATENT DOCUMENTS

| DE | 102010050055 A1 | 5/2012 |
| DE | 102016213767 A1 | 2/2018 |
| DE | 102020105607 B3 | 6/2021 |
| EP | 3015695 A1 | 5/2016 |

OTHER PUBLICATIONS

Notification of Transmittal of Translation of the International Preliminary Report on Patentability issued on Mar. 23, 2023, in corresponding International Application No. PCT/EP2021/070412, 9 pages.

International Search Report and Written Opinion issued on Nov. 15, 2021, in corresponding International Application No. PCT/EP2021/070412, 16 pages.

* cited by examiner

METHOD FOR OPERATING AN EXHAUST-GAS CLEANING DEVICE FOR A MOTOR VEHICLE AND CORRESPONDING EXHAUST-GAS CLEANING DEVICE

FIELD

The invention relates to a method for operating an exhaust gas cleaning device for a motor vehicle, wherein the exhaust gas cleaning device has a vehicle catalytic converter, a first lambda probe arranged upstream of the vehicle catalytic converter, and a second lambda probe arranged downstream of the vehicle catalytic converter. The invention furthermore relates to an exhaust gas cleaning device for a motor vehicle.

BACKGROUND

Publication DE 10 2020 105 607 B3 is known from the prior art, for example. This describes a method for lambda control in an internal combustion engine having a catalytic converter in the exhaust gas tract and at least one lambda probe which is arranged inside the catalytic converter. With this arrangement of the upstream probe, signal delays occur that reduce the speed of the lambda controller. For compensation, the measurement signals from the first lambda probe are applied to a lambda evaluation unit, which corrects a delay of the measurement signals, and the corrected lambda probe signal is applied to a unit for lambda control. Both lambda probes are connected to a unit for lambda control.

Furthermore, publication DE 10 2016 213 767 A1 discloses a method for diagnosing an exhaust system of an internal combustion engine having at least one three-way catalytic converter, at least one four-way catalytic converter, and at least one binary lambda probe, in which a functionality of the at least one binary lambda probe and/or the at least one four-way catalytic converter is checked based on a lambda change when the internal combustion engine changes from lean operation to rich operation following overrun operation in order to clear out the at least one three-way catalytic converter.

Finally, publication US 2016/0 160 778 A1 describes a diagnostic system for an internal combustion engine. The diagnostic system calculates a first characteristic curve of the change of the a first air-fuel ratio at the time at which the air-fuel ratio passes a first air-fuel ratio range, which is leaner than a stoichiometric air-fuel ratio, and a second characteristic curve of the change of the air-fuel ratio change at the time at which the air-fuel ratio passes a second air-fuel ratio range, which comprises a stoichiometric air-fuel ratio. The diagnostic system diagnoses a deviation of the sensor based on the first characteristic curve and the second characteristic curve.

SUMMARY

It is the object of the invention to propose a method for operating an exhaust gas cleaning device for a motor vehicle which has advantages over known methods, in particular enables a simple check of the functionality of the second lambda probe and/or the vehicle catalytic converter.

This object is achieved according to the invention by a method for operating an exhaust gas cleaning device for a motor vehicle. It is provided that a signal gradient is determined chronologically between a first signal jump of a measured value of the first lambda probe in a first direction and a second signal jump of the measured value in a second direction opposite to the first direction, and a signal delay of a measured value of the second lambda probe is determined after the second signal jump, wherein the signal delay corresponds to a period of time between the second signal jump and a reaction of the measured value of the second lambda probe to the second signal jump, and wherein a defect of the second lambda probe is identified if the signal gradient is less than a signal gradient threshold value and the signal delay is greater than a signal delay threshold value, and/or a defect of the vehicle catalytic converter is identified if the signal gradient is less than the signal gradient threshold value and the signal delay is less than the signal delay threshold value.

The method is used to operate the exhaust gas cleaning device. The exhaust gas cleaning device is, for example, part of the motor vehicle, but can of course also be present separately from it. The exhaust gas cleaning device is preferably part of a drive device of the motor vehicle, which is used to drive the motor vehicle and in this respect to provide a drive torque directed toward driving the motor vehicle. To generate the drive torque, the drive device has at least one drive assembly.

During its operation, the drive device, in particular the drive assembly, generates exhaust gas, which is discharged in the direction of an external environment of the drive device. The exhaust gas cleaning device is located fluidically between the drive assembly and the outside environment. The exhaust gas cleaning device is used to clean the exhaust gas, i.e., to convert pollutants into less dangerous products. The exhaust gas generated by the drive assembly is supplied to the exhaust gas cleaning device and released into the outside environment after flowing through the exhaust gas cleaning device.

The exhaust gas is cleaned by the exhaust gas cleaning device with the aid of the vehicle catalytic converter. The vehicle catalytic converter is present, for example, as a three-way catalytic converter, oxidation catalytic converter, storage catalytic converter, in particular $NO_x$ storage catalytic converter, or as an SCR catalytic converter. A particle filter can be integrated into the vehicle catalytic converter. The first lambda probe is located upstream of the vehicle catalytic converter with respect to a flow direction of the exhaust gas through the exhaust gas cleaning device or through the vehicle catalytic converter, whereas the second lambda probe is arranged downstream of the vehicle catalytic converter with respect to the flow direction of the exhaust gas.

The lambda probes are used to determine the combustion air ratio 2. For this purpose, they measure in particular a residual oxygen content present in the exhaust gas. Each of the lambda probes accordingly supplies a measured value. The first lambda probe is preferably in the form of a broadband lambda probe and the second lambda probe is in the form of a jump lambda probe. In this case, the measured value of the first lambda probe is preferably indicated in the form of the combustion air ratio 2 and the measured value of the second lambda probe is indicated as a voltage.

The broadband lambda probe is distinguished in that it allows the combustion air ratio to be determined over a wide range. For example, the broadband lambda probe has for this purpose a pump cell and a Nernst cell, between which a measurement volume is present. The measurement volume is fluidically connected to an exhaust gas line carrying the exhaust gas via a diffusion channel that leads through the pump cell. An amperage of an electrical current flowing through the pump cell is set in such a way that a combustion air ratio of $\lambda=1$ is present in the measurement volume. For this purpose, a measured value of the Nernst cell is used, which is set to a value corresponding to the combustion air ratio of $\lambda=1$, in particular by means of a controller.

In comparison to this, the jump lambda probe has a simpler structure and consists, for example, solely of a Nernst cell. A characteristic curve of the jump lambda probe is distinguished in that its measured value has a large gradient in the range of a combustion air ratio of $\lambda=1$. The gradient of the measured value is therefore significantly larger in a range around $\lambda=1$ than outside of this range.

For example, the measured value of the first lambda probe is used to carry out a lambda control of the drive device or the drive assembly. The measured value of the second lambda probe, on the other hand, is used to carry out a trim control. The trim control is used to compensate for any deviations of the first lambda probe, so that the lambda control is carried out more accurately.

Since the second lambda probe is of essential importance for the accuracy of the lambda control, it is necessary to diagnose faults of the second lambda probe as quickly as possible in order to be able to initiate appropriate countermeasures. For example, in the event of a defect of the second lambda probe, it is provided that a nominal output of the drive device or the drive assembly is reduced. To diagnose the second lambda probe, the signal gradient of the measured value of the second lambda probe and the signal delay of the measured value are determined. This determination takes place in chronological dependence on the first signal jump and the second signal jump of the measured value of the first lambda probe. In this way, the signal gradient is determined chronologically between the first signal jump and the second signal jump, and the signal delay is determined chronologically after the second signal jump.

The signal gradient is to be understood as a slope of the measured value of the second lambda probe over time, whereas the signal delay describes a lag of the measured value of the second lambda probe. The signal delay therefore corresponds to a period of time between the second signal jump and a reaction of the measured value of the second lambda probe to this second signal jump. The first signal jump and the second signal jump are to be understood as jumps of the measured value of the first lambda probe, i.e., measured values for which a gradient of the measured value, in particular an absolute value of the gradient, exceeds a gradient threshold value. It is therefore initially irrelevant whether the measured value increases or decreases. All that matters is that the sign-filtered gradient exceeds the gradient threshold value.

The signal gradient and the signal delay are evaluated in order to diagnose the second lambda probe. In principle, it could be provided that the defect of the second lambda probe is already identified if the signal gradient is less than the signal gradient threshold value. The signal gradient threshold value is to be understood as a threshold value for the signal gradient, which was preferably determined empirically and when the signal gradient falls below this threshold, a defect of the second lambda probe can be assumed. However, it is to be noted here that the measurement signal of the second lambda probe does not directly follow the measurement signal of the first lambda probe, but also depends on the vehicle catalytic converter, in particular a condition of the vehicle catalytic converter.

In order to avoid an incorrect identification of the defect of the second lambda probe due to this influence of the vehicle catalytic converter, the signal delay is used for the diagnosis of the second lambda probe in addition to the signal gradient. Thus, if the signal gradient falls below the signal gradient threshold value, the defect of the second lambda probe is only identified if the signal delay is also greater than the signal delay threshold value. The signal delay threshold value is also preferably determined empirically and has a value from which it can be assumed that the second lambda probe is defective, in particular if the signal gradient is also less than the signal gradient threshold value.

In order to identify the defect of the second lambda probe, it is thus not sufficient that only the signal gradient is less than the signal gradient threshold value. Rather, the signal delay also has to be greater than the signal delay threshold value. In other words, when the signal gradient falls below the signal gradient threshold value, the defect of the second lambda probe is only identified if the signal delay is greater than the signal delay threshold value at the same time. As a result, a reliable diagnosis of the second lambda probe is implemented.

Additionally or alternatively, the signal gradient and the signal delay can be used for a diagnosis of the vehicle catalytic converter. It has already been explained above that the measured value of the second lambda probe not only always follows the measured value of the first lambda probe, but that the measured value of the second lambda probe additionally depends on the condition of the vehicle catalytic converter. If the signal gradient is now less than the signal gradient threshold value and the signal delay is also less than the signal delay threshold value, the defect of the vehicle catalytic converter is identified. In other words, when the signal gradient falls below the signal gradient threshold value, the defect of the vehicle catalytic converter is only identified if the signal delay is less than the signal delay threshold value.

The diagnosis of the second lambda probe and/or the vehicle catalytic converter preferably takes place in two stages. First, only the signal gradient is compared with the signal gradient threshold value and the signal delay is determined, but is initially disregarded. Only when the signal gradient is less than the signal gradient threshold value is the signal delay compared to the signal delay threshold value in a second step. If the signal delay is greater than the signal delay threshold value, the defect of the second lambda probe is identified. Additionally or alternatively, the functionality of the vehicle catalytic converter can be identified. However, if the signal delay is less than the signal delay threshold value, the defect of the vehicle catalytic converter is identified. Additionally or alternatively, the functionality of the second lambda probe can be identified.

The procedure described enables a particularly accurate diagnosis of the second lambda probe and/or the vehicle catalytic converter. In particular, an erroneous identification of the defect of the second lambda probe is effectively avoided in that not only one variable, namely the signal gradient, is used for the diagnosis, but also a further variable, namely the signal delay. This procedure also allows— optionally— a statement about the condition of the vehicle catalytic converter.

A refinement of the invention provides that the greatest gradient of the measured value of the second lambda probe occurring between the first signal jump and the second signal jump is used as the signal gradient. For example, for this purpose the gradient of the measured value of the second lambda probe is determined continuously or periodically between the first signal jump and the second signal jump. The greatest gradient that occurs during this period is used as the signal gradient. The signal gradient is preferably signed-filtered, i.e., it corresponds to an absolute value of the greatest gradient between the two signal jumps. As a result, a high level of accuracy is achieved when diagnosing the second lambda probe.

One refinement of the invention provides that a period of time between the second signal jump and a sign change of the gradient of the measured value of the second lambda probe is used as the signal delay. As already explained, the signal delay corresponds to the period of time after which the measured value of the second lambda probe shows a reaction to the second signal jump. The sign change of the gradient of the measured value of the second lambda probe is used as a criterion for the reaction. This sign change occurs because the second signal jump describes a deflection of the measured value of the first lambda probe in a different direction than that which occurs with the first signal jump. Thus, while the measured value of the first lambda probe changes in the first direction during the first signal jump, it changes in the second direction, which is opposite to the first direction, during the second signal jump. Accordingly, the signal delay can be determined with a high degree of accuracy based on the sign change.

One refinement of the invention provides that the first signal jump and/or the second signal jump is identified when the measured value of the first lambda probe changes from a value of greater than or equal to one to a value of less than or equal to one or from a value of less than or equal to one to a value of greater than or equal to one while exceeding a specific value difference. For the presence of the first signal jump or the second signal jump, it is therefore always necessary for the measured value of the first lambda probe to change by the specific value difference during the respective signal jump, wherein the value difference is to be understood as a difference of the measured value of the first lambda probe immediately before the respective signal jump to its measured value immediately after the respective signal jump.

In the context of the signal jump, the measured value changes, for example, from a value greater than one to the value of one or to a value less than one. Likewise, it can change from the value of one to the value of less than one. The same applies vice versa. The measured value of the first lambda probe of one is to be understood here as a measured value which corresponds to a stoichiometric combustion air ratio. Analogous to this, the measured value of the first lambda probe of greater than one corresponds to excess air and a value of less than one to insufficient air in the exhaust gas.

The difference in values has to correspond, for example, to at least 0.01, at least 0.02, at least 0.03, at least 0.04, or at least 0.05, wherein the latter two values are preferred. It can also be provided that the value difference for identifying the first signal jump is greater than the value difference for identifying the second signal jump. For example, the former is greater than the latter by a factor of at least 1.5, at least 1.75, or at least 2.0. In this case, for example, the first signal jump is only identified when the value difference is at least 0.05, at least 0.075 or at least 0.10, whereas the second signal jump is already identified when the value difference is between 0.01 and 0.05 (or more).

Particularly preferably, the first signal jump is only identified when the measured value of the first lambda probe indicates a change from excess air to insufficient air. The second signal jump is only identified, for example, when a change from insufficient air to at least a stoichiometric combustion air ratio or excess air is recognized. As a result, a high level of accuracy is achieved when diagnosing the second lambda probe.

One refinement of the invention provides that when the signal gradient exceeds the signal gradient threshold value, a functionality of the second lambda probe is identified. If the signal gradient is greater than the signal gradient threshold value, it can be reliably assumed that the second lambda probe is functioning. An evaluation of the signal delay can be omitted in this case. For example, the functionality of the second lambda probe can be established immediately after the second signal jump and without determining the signal delay, namely when the signal gradient exceeds the signal gradient threshold value. This enables a particularly rapid evaluation. It is provided, for example, that the signal delay is determined only when the signal gradient falls below the signal gradient threshold value. In contrast, when the signal gradient exceeds the signal gradient threshold value, the signal delay is not determined.

One refinement of the invention provides that if the signal gradient falls below the signal gradient threshold value and in addition the signal delay falls below the signal delay threshold value, a functionality of the second lambda probe is identified. In other words, a defect of the second lambda probe is only identified if the signal gradient falls below the signal gradient threshold value, on the one hand, and the signal delay is greater than the signal delay threshold value, on the other hand. If one of the conditions does not apply, the functionality of the second lambda probe is assumed. As already explained above, depending on the signal gradient, it is even possible to dispense with the evaluation of the signal delay. This enables the second lambda probe to be diagnosed quickly and accurately.

One refinement of the invention provides that when the signal delay threshold value is exceeded by the signal delay, the defect of the second lambda probe is always identified. If the signal delay is evaluated, for example as a function of the value of the signal gradient, then the defect of the second lambda probe is always identified if the signal delay is greater than the signal delay threshold value. In particular, it is thus irrelevant whether the signal delay is only evaluated as a function of the value of the signal gradient or whether the signal delay is always determined independently of the value of the signal gradient. If the specified criterion is met, the defect of the second lambda probe is always identified.

One refinement provides that if the signal delay exceeds the signal delay threshold value, the signal gradient is compared to the signal gradient threshold value, wherein if the signal gradient falls below a further signal gradient threshold value, the defect of the vehicle catalytic converter is identified and if the signal gradient exceeds the further signal gradient threshold value, a functionality of the vehicle catalytic converter is identified. In this way, in addition to the diagnosis of the second lambda probe, the diagnosis of the vehicle catalytic converter can also be carried out.

When the signal delay threshold value is exceeded by the signal delay, it is always assumed that the second lambda probe is defective. However, an unambiguous statement about the condition of the vehicle catalytic converter can be determined with the aid of the further signal gradient threshold value. The further signal gradient threshold is lower than the signal gradient threshold. If the signal gradient falls below the signal gradient threshold value, there is a suspicion that the vehicle catalytic converter is defective. For this reason, a more differentiated consideration is made using the further signal gradient threshold value.

If the signal gradient is less than the further signal gradient threshold value, it can be safely assumed that the vehicle catalytic converter is defective, in addition to the defect of the second lambda probe. If, on the other hand, the signal gradient exceeds the further signal gradient threshold value, i.e., the signal gradient is between the further signal gradient threshold value and the signal gradient threshold value, the functionality of the vehicle catalytic converter can be assumed, at least a restricted functionality. The procedure described enables not only a diagnosis of the second lambda probe, but also of the vehicle catalytic converter.

One refinement of the invention provides that the further signal gradient threshold value is selected to be less than the signal gradient threshold value. This has already been mentioned above. For example, the further signal gradient threshold is at most 75%, at most 60%, or at most 50% of the signal gradient threshold value. Such a choice of the further signal gradient threshold value enables the differentiated consideration of the functionality of the vehicle catalytic converter.

The invention furthermore relates to an exhaust gas cleaning device for a motor vehicle, in particular for carrying out the method according to the statements in the context of this description, wherein the exhaust gas cleaning device has a vehicle catalytic converter, a first lambda probe arranged upstream of the vehicle catalytic converter, and a second lambda probe arranged downstream of the vehicle catalytic converter It is provided that the exhaust gas cleaning device is provided and designed to determine a signal gradient chronologically between a first signal jump of a measured value of the first lambda probe in a first direction and a second signal jump of the measured value in a second direction opposite to the first direction, and a signal delay of a measured value of the second lambda probe is determined after the second signal jump, wherein the signal delay corresponds to a period of time between the second signal jump and a reaction of the measured value of the second lambda probe to the second signal jump, and wherein a defect of the second lambda probe is identified if the signal gradient is less than a signal gradient threshold value and the signal delay is greater than a signal delay threshold value, and/or a defect of the vehicle catalytic converter is identified if the signal gradient is less than the signal gradient threshold value and the signal delay is less than the signal delay threshold value.

The advantages of such a design of the exhaust gas cleaning device and such a procedure have already been discussed. Both the exhaust gas cleaning device and also the method for its operation can be refined according to the statements within the scope of this description, to which reference will therefore be made.

The features and feature combinations described in the description, in particular the features and feature combinations described below in the description of the figures and/or shown in the figures may be used not only in the respective combination specified, but also in other combinations or alone, without departing from the scope of the invention. The invention should therefore also be considered to comprise embodiments that are explicitly not shown or explained in the description and/or the figures, but emerge from the explained embodiments or can be derived therefrom.

BRIEF DESCRIPTION OF THE FIGURES

In the following, the invention will be explained in greater detail with reference to the exemplary embodiments depicted in the drawings, without this restricting the invention. In the figures.

DETAILED DESCRIPTION

Figure 1:
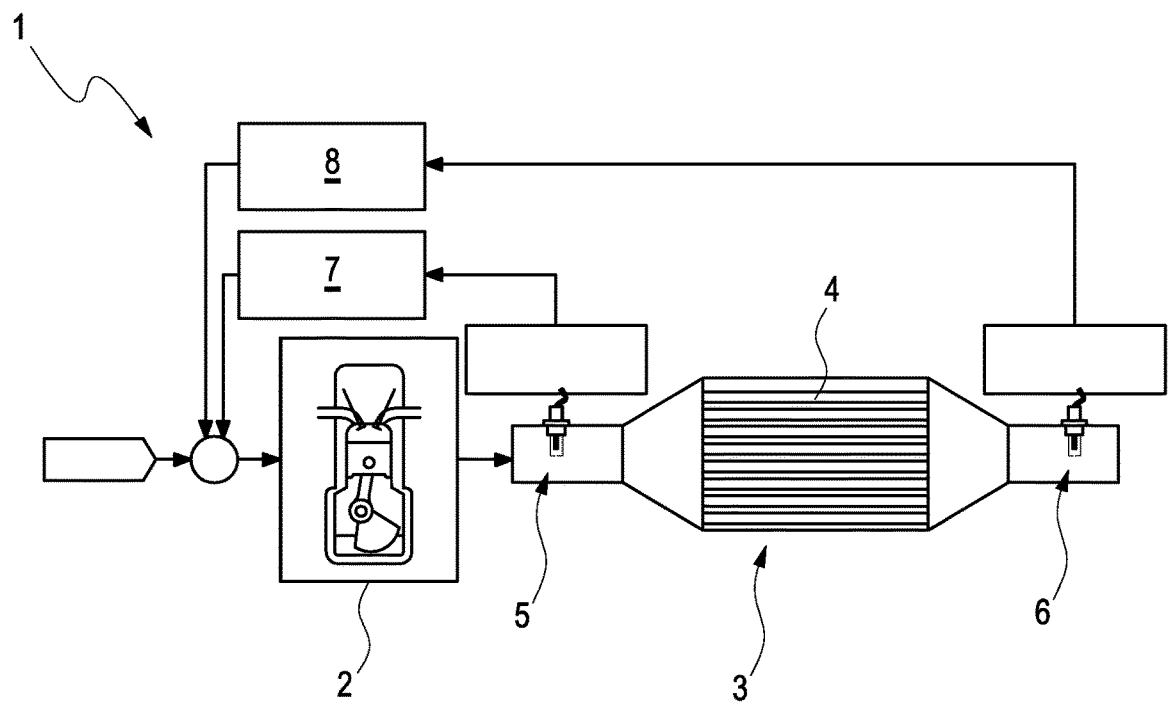
FIG. 1 shows a schematic representation of a drive device for a motor vehicle.

FIG. 1 shows a schematic representation of a drive device 1 for a motor vehicle. The drive device 1 has an exhaust gas-generating drive assembly 2, in the exemplary embodiment shown here an internal combustion engine. The exhaust gas generated by the drive assembly 2 is fed to an exhaust gas cleaning device 3 which, in addition to a vehicle catalytic converter 4, has a first lambda probe 5 and a second lambda probe 6. The first lambda probe 5 is arranged upstream of the vehicle catalytic converter 4 and the second lambda probe 6 downstream of the vehicle catalytic converter 4 with respect to a flow direction of the exhaust gas. A measured value of the first lambda probe 5 is fed to a first controller 7, which carries out a lambda control of the drive assembly 2. On the other hand, a measured value of the second lambda probe 6 is fed to a second controller 8 which carries out a trim control, which corrects deviations of the measured value of the first lambda probe 5.

Figure 2:
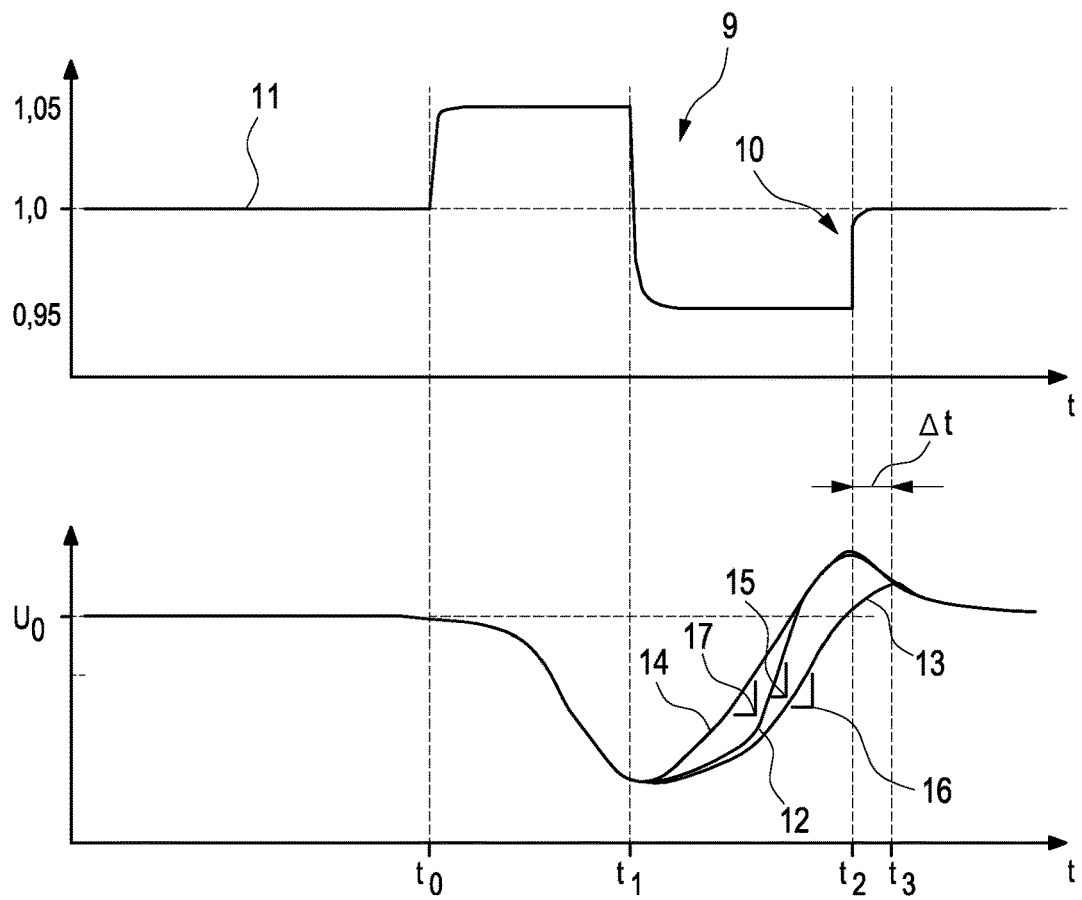
FIG. 2 shows two diagrams which are used to explain a method for operating an exhaust gas cleaning device of the drive device.

FIG. 2 shows two diagrams which are used to explain a method for operating an exhaust gas cleaning device 3 of the drive device 1. An upper one of the diagrams shows the course of a measured value of the first lambda probe 5 over time t. The measured values are to be understood as the combustion air ratio lambda, wherein $\lambda=1$ corresponds to a stoichiometric combustion air ratio. A lower one of the diagrams shows the course of the measured values of the second lambda probe 6 over time t. These measured values are to be understood as electrical voltages, wherein the voltage $U_0$ is present at a stoichiometric combustion air ratio.

A diagnosis of the second lambda probe 6 is carried out as part of the method for operating the exhaust gas cleaning device 3. The drive assembly 2 is operated for this purpose in such a way that the measured values of the first lambda probe 5 have multiple signal jumps over time t, in particular a first signal jump 9 and a second signal jump 10. The two signal jumps 9 and 10 are clearly apparent in a profile 11 of the measured values of the first lambda probe 5 over time t. For example, it is provided that the drive assembly 2 to be operated in such a way that at a point in time to, starting from a stoichiometric combustion air ratio, a combustion air ratio of greater than one is set, in particular a combustion air ratio of 1.05.

In order to generate the first signal jump 9, the drive assembly 2 is activated at point in time $t_1$ in such a way that the combustion air ratio falls below one, in particular to 0.95. The first signal jump 9 therefore comprises a change of the measured value of the first lambda probe 5 by a difference of 0.1. In order to generate the second signal jump 10 at point in time $t_2$, the drive assembly 2 is activated in such a way that the combustion air ratio is set to the value of one, starting from the value of less than one. This value is subsequently retained at least up to a point in time $t_3$.

Depending on the state of the second lambda probe 6 and the vehicle catalytic converter 4, different profiles 12, 13 and 14 result for the measured value of the second lambda probe 6. The profile 12 shows the measured values over time tin the case of a functionality of the second lambda probe 6 and a functionality of the vehicle catalytic converter 4. The profile 13 shows the measured values of the second lambda probe 6 over time tin the case of a defect of the second lambda probe 6 with simultaneous functionality of the vehicle catalytic converter 4. The profile 14, on the other hand, shows the measured value of the second lambda probe 6 over time with a functioning second lambda probe 6, which, however, deviates from the profile 12 due to a given operating state of vehicle catalytic converter 4.

To diagnose the second lambda probe 6, a signal gradient 15, 16, or 17 for the profiles 12, 13, and 14, respectively, is determined between the signal jumps 9 and 10. This is only indicated. If the respective signal gradient 15, 16, or 17 is greater than a signal gradient threshold value, the functionality of the second lambda probe 6 is assumed. The stated condition applies to the profile 12, so that the functionality of second lambda probe 6 can be established immediately. The profile 13 is shown for comparison, for which the signal gradient 16 is less than the signal gradient threshold value. In this case, the defect of the second lambda probe 6 can be identified immediately.

For the profile 14, however, the signal gradient is less than the signal gradient threshold value, although the second lambda probe 6 is basically functional. For this reason, it is provided that a signal delay Δt is determined at least in the case that the signal gradient falls below the signal gradient threshold value after the second signal jump 10. The signal delay Δt describes the period of time after which the measured value of the second lambda probe 6 reacts to the second signal jump 10. It is apparent that for the profiles 12 and 14 the reaction is almost immediate, so that the corresponding signal delay falls below the signal delay threshold value in each case. However, for the profile 13, the signal delay Δt is greater than the signal delay threshold value. In this case, the defect of the second lambda probe 6 can be identified.

It can be reliably identified on the basis of both the signal gradient and the signal delay whether the second lambda probe 6 is functional or defective. Thus, if the signal gradient falls below the signal gradient threshold value, the defect of the second lambda probe 6 is only identified if the signal delay Δt is also greater than the signal delay threshold value. If this is the case, the functionality of the second lambda probe 6 is identified, even though the signal gradient is less than the signal gradient threshold value. This procedure enables a reliable diagnosis of the second lambda probe 6 and optionally the vehicle catalytic converter 4.

LIST OF REFERENCE NUMERALS

1 drive device
2 drive assembly
3 exhaust gas cleaning device
4 vehicle catalytic converter
5 first lambda probe
6 second lambda probe
7 first controller
8 second controller
9 first signal jump
10 second signal jump
11 profile
12 profile
13 profile
14 profile
15 signal gradient
16 signal gradient
17 signal gradient

The invention claimed is:

1. A method for operating an exhaust gas cleaning device for a motor vehicle, wherein the exhaust gas cleaning device has a vehicle catalytic converter, a first lambda probe arranged upstream of the vehicle catalytic converter, and a second lambda probe arranged downstream of the vehicle catalytic converter, the method comprising:
   determining a signal gradient chronologically between a first signal jump of a measured value of the first lambda probe and a second signal jump of the measured value in a second direction opposite to the first direction;
   determining a signal delay of a measured value of the second lambda probe after the second signal jump, wherein the signal delay corresponds to a period of time between the second signal jump and a reaction of the measured value of the second lambda probe to the second signal jump;
   identifying a defect of the second lambda probe after the signal gradient is less than a signal gradient threshold value and the signal delay is greater than a signal delay threshold value, wherein a nominal output of either a drive device or a drive assembly is reduced after the identification of the defect in the second lambda probe; and
   identifying a defect in the vehicle catalytic converter after the signal gradient is less than the signal gradient threshold and the signal delay is less than the signal delay threshold value.

2. The method as claimed in claim 1, wherein the greatest gradient of the measured value of the second lambda probe occurring between the first signal jump and the second signal jump is used as the signal gradient.

3. The method as claimed in claim 2, wherein a period of time between the second signal jump and a sign change of the gradient of the measured value of the second lambda probe is used as the signal delay.

4. The method as claimed in claim 2, wherein when the signal gradient exceeds the signal gradient threshold value, a functionality of the second lambda probe is identified.

5. The method as claimed in claim 2, wherein when the signal gradient falls below the signal gradient threshold value and in addition the signal delay falls below the signal delay threshold value, a functionality of the second lambda probe is identified.

6. The method as claimed in claim 1, wherein a period of time between the second signal jump and a sign change of the gradient of the measured value of the second lambda probe is used as the signal delay.

7. The method as claimed claim 6, wherein the first signal jump and/or the second signal jump is identified when the measured value of the first lambda probe changes from a value of greater than or equal to one to a value less than or equal to one or from a value less than or equal to one to a value greater than or equal to one while exceeding a specific value difference.

8. The method as claimed in claim 6, wherein when the signal gradient exceeds the signal gradient threshold value, a functionality of the second lambda probe is identified.

9. The method as claimed in claim 6, wherein when the signal gradient falls below the signal gradient threshold value and in addition the signal delay falls below the signal delay threshold value, a functionality of the second lambda probe is identified.

10. The method as claimed claim 1, wherein the first signal jump and/or the second signal jump is identified when the measured value of the first lambda probe changes from a value of greater than or equal to one to a value less than or equal to one or from a value less than or equal to one to a value greater than or equal to one while exceeding a specific value difference.

11. The method as claimed in claim 10, wherein when the signal gradient exceeds the signal gradient threshold value, a functionality of the second lambda probe is identified.

12. The method as claimed in claim 10, wherein when the signal gradient falls below the signal gradient threshold value and in addition the signal delay falls below the signal delay threshold value, a functionality of the second lambda probe is identified.

13. The method as claimed in claim 1, wherein when the signal gradient exceeds the signal gradient threshold value, a functionality of the second lambda probe is identified.

14. The method as claimed in claim 13, wherein when the signal gradient falls below the signal gradient threshold value and in addition the signal delay falls below the signal delay threshold value, a functionality of the second lambda probe is identified.

15. The method as claimed in claim 1, wherein when the signal gradient falls below the signal gradient threshold value and in addition the signal delay falls below the signal delay threshold value, a functionality of the second lambda probe is identified.

16. The method as claimed in claim 1, wherein when the signal delay exceeds the signal delay threshold value, a defect of the second lambda probe is always identified.

17. The method as claimed in claim 1, further comprising, when the signal delay exceeds the signal delay threshold value;
    comparing the signal gradient to the signal gradient threshold value;
    after the signal gradient falls below a further signal gradient threshold value, identifying the defect of the vehicle catalytic converter; and
    after the signal gradient exceeds the further signal gradient threshold value, identifying a functionality of the vehicle catalytic converter.

18. The method as claimed in claim 17, wherein the further signal gradient threshold value is selected to be less than the signal gradient threshold value.

19. The method as claimed claim 2, wherein the first signal jump and/or the second signal jump is identified when the measured value of the first lambda probe changes from a value of greater than or equal to one to a value less than or equal to one or from a value less than or equal to one to a value greater than or equal to one while exceeding a specific value difference.

20. An exhaust gas cleaning device for a motor vehicle comprising:
    a vehicle catalytic converter,
    a first lambda probe arranged upstream of the vehicle catalytic converter, and
    a second lambda probe arranged downstream of the vehicle catalytic converter, wherein the exhaust gas cleaning device is configured to;
    determine a signal gradient chronologically between a first signal jump of a measured value of the first lambda probe and a second signal jump of the measured value in a second direction opposite to the first direction,
    determine a signal delay of a measured value of the second lambda probe after the second signal jump, wherein the signal delay corresponds to a period of time between the second signal jump and a reaction of the measured value of the second lambda probe to the second signal jump,
    identify a defect of the second lambda probe after the signal gradient is less than a signal gradient threshold value and the signal delay is greater than a signal delay threshold value, wherein a nominal output of either a drive device or a drive assembly is reduced after the identification of the defect in the second lambda probe, and
    identify a defect in the vehicle catalytic converter after the signal gradient less than the signal gradient threshold and the signal delay is less than the signal delay threshold value.

* * * * *